United States Patent Office 3,075,753
Patented Jan. 29, 1963

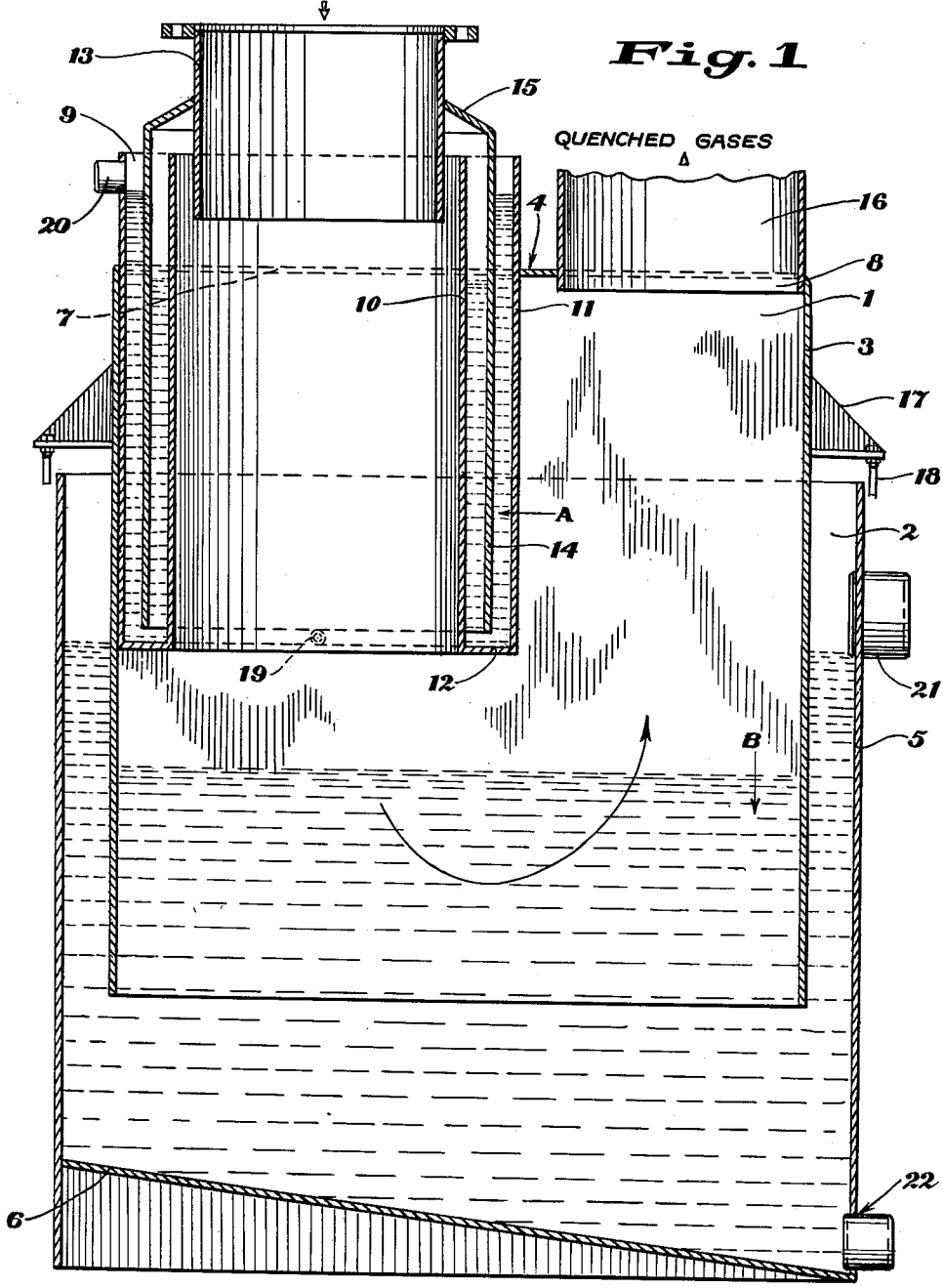

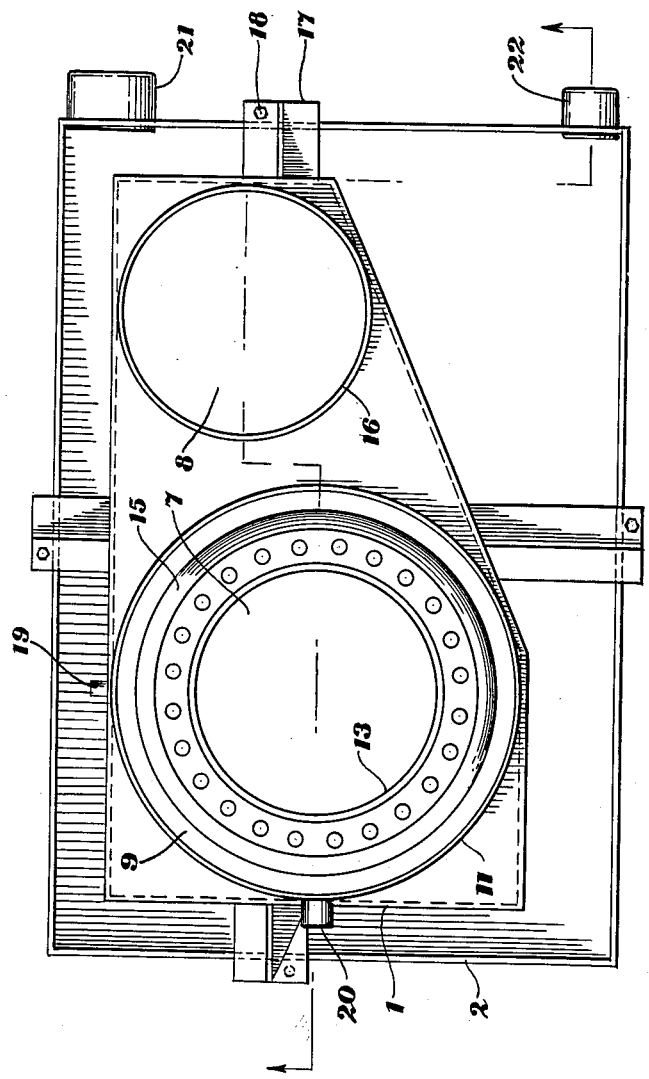

3,075,753
FURNACE CONNECTING APPARATUS
George A. Akin, Kingsport, Tenn., assignor to Eastman Kodak Company, Rochester, N.Y., a corporation of New Jersey
Filed Jan. 11, 1960, Ser. No. 1,494
3 Claims. (Cl. 261—119)

This invention relates to an expansion compensating and moisture condensing connection for hot gas conduits offering particular advantages as an apparatus for connecting flame cracking furnaces to downstream piping connections.

In flame cracking furnaces of the type with which this invention is concerned, temperatures as high as 2000° centigrade are reached in cracking such hydrocarbons as ethane, methane, propane, and butane to produce acetylene, ethylene, and propylene. Furnace temperatures of this magnitude often result in the metal of the conduits reaching temperatures as high as 900° centigrade. With temperatures of such magnitude involved, for the sake of the safety of work personnel in the vicinity of the furnaces and furnace conduits and the continued maintenance of furnace operations in general, it becomes imperative to provide connections between furnaces and downstream piping connections which do not transmit thermally imposed forces, which are not themselves susceptible to mechanical failure, and which provide maximum safety in working operations. It is an object of this invention to provide a connecting apparatus which not only fulfills all of these requirements but which performs the additional function of acting as a liquid gas separator to remove quench water which may be carried by furnace gases.

A conventional arrangement of flame cracking furnaces requires that conduits leading from furnaces as well as downstream piping conduits be positioned vertically. Because of the high temperature of the furnace gases conveyed within these conduits, severe thermal stresses are developed in the conduits which result in longitudinal conduit movement of such a magnitude as to frequently result in conduit rupture or failure.

To avoid the often disastrous effect of such thermally imposed stresses, it has heretofore been proposed to interpose mechanical or liquid seal expansion joints between the furnace and downstream piping conduits. While such expedients have to a limited extent alleviated the thermally imposed stresses, they have generally proven both cumbersome and incompletely effective. The mechanical joints, being rigidly connected to the conduits, have not only transmitted stress but, in being subjected to the same thermal stresses as were applied to the conduits, have themselves proven to be susceptible to mechanical fatigue and failure. Liquid seal expansion joints, as heretofore utilized, have resulted in bulky and awkward installations of a generally inefficient and uneconomical character.

To obviate the deficiencies of prior art installations and accomplish the stated object and other objects of this invention, it is contemplated to provide an apparatus for connecting a flame cracking furnace to downstream piping connections, which apparatus includes a liquid gas separator having telescoping upper and lower housing members. The lower housing member defines an upwardly open chamber containing a liquid body providing a liquid condensing surface. The upper housing member defines a downwardly open chamber extending partially into the liquid body to form a liquid seal expansion joint sealingly connecting the telescoping upper and lower separator housing members. In the upper housing, there is provided an inlet surrounded by a second liquid body. The separator is connected to a furnace conduit extending vertically downwardly from the furnace and to a downstream piping conduit extending vertically upward. The lower terminus of one of these conduits extends partially into the liquid body surrounding the upper housing inlet to form a liquid seal expansion joint telescopingly and sealingly connecting this conduit to the separator. The lower terminus of the other conduit is connected in fluid communication to the separator.

Having generally described the apparatus by which the objects of this invention are to be accomplished, a fuller appreciation of the invention may be derived by reference to the accompanying drawings in which FIGURE 1 is a sectional view showing the relative positioning of conduits, upper and lower separator housing memers, and connecting liquid seals; and FIGURE 2 is a top plan view showing the positioning of conduits with respect to separator components.

As shown in the drawings, the liquid-gas separator includes upper housing 1 and lower housing 2. As illustrated in FIGURE 1, upper housing 1, which defines a downwardly open chamber, includes peripheral side wall 3 and upper wall 4. Lower housing member 2 is shown as including side wall 5 and inclined bottom wall 6. Contained within lower housing member 2 is a liquid body B which, although preferably water, could be any known liquid seal sealant such as mercury, organic liquids, etc. To telescopingly and sealingly connect upper housing member 1 and lower housing member 2, the lower terminus of side wall 3 extends into liquid body B. Wall 3 and liquid body B thus define a liquid seal expansion joint telescopingly and sealingly interconnecting upper housing member 1 and lower housing member 2 with liquid body B also providing within wall 3 a liquid condensing surface.

In upper wall 4 of upper housing member 1, there is provided inlet opening 7 and outlet opening 8. Surrounded by inlet opening 7 and carried by upper wall member 4 is annular liquid body A. This body of liquid is contained within an annular trough 9 defined by inner wall 10, outer wall 11, and lower connecting wall 12.

As will readily be appreciated, the cross section configuration of inlet 7, annular trough 9, and outlet 8 may assume any of several geometric forms. However, in general, this configuration will be determined by the cross section configuration of the furnace conduit and downstream piping connections to be joined. Such conduits, in general being circular, openings 7 and 8 and annular trough 9 will also, as a rule, be circular in cross section.

Extending vertically downward to the separator is furnace conduit 13. To provide a more desirable mode of connection with the separator, the lower terminus of conduit 13 has been modified by the addition of conduit section 14 of a somewhat larger diameter. The diameter of conduit section 14 is such as to permit its insertion into liquid body A between walls 10 and 11 of annular trough 9. Being connected to the lower terminus of furnace conduit 13 through collar section 15, conduit section 14 effectively telescopingly and sealingly interconnects furnace conduit 13 and upper housing 1 of the separator.

Through the addition of conduit section 14, a connection between furnace conduit 13 and upper housing 1 is effected which permits conduit 13 to have a portion extending into inlet 7 as well as a portion forming a part of a liquid seal expansion joint. Although such a composite structural arrangement offers several advantages, including shielding of the liquid seal from the conduit carried gases, it would be possible to merely extend a lower portion of conduit 13 itself into a suitably dimensioned annular liquid body to form the connection between conduit 13 and upper housing 1.

Extending vertically upward from the separator to downstream piping connections is downstream piping conduit 16. The lower terminus of conduit 16 is connected in fluid communication to the upper wall 4 of upper housing 1 at outlet 8. In being so connected, conduit 16 and lower separator housing member 2, through the intermediary liquid body B and wall 3 of upper housing 1, are telescopingly and sealingly interconnected.

Furnace conduit 13 and downstream piping conduit 16, both being telescopingly related to the separator, relative vertical movement between these conduits is possible which is mutually noninterfering. This independence of longitudinal movability prevents the transmittal of stresses induced in one of the conduits to the other and thus materially diminishes the likelihood of conduit failure.

By virtue of the utilization of liquid seal telescoping connections, some lateral movement of conduits 13 and housing member 1 connected to conduit 16 is made possible within the confines of their respectively associated liquid seals. Such lateral freedom of movement inhibits the transmittal of thermally induced conduit misalignment.

As specifically described, the connecting apparatus includes a furnace conduit extending into a liquid seal carried by a separator housing member while a downstream piping conduit is connected directly to this same housing member. It should be recognized, though, that under certain circumstances, it may be desirable to reverse these connections, i.e. to allow the downstream piping conduit to engage the liquid seal and to secure the furnace conduit directly to the separator. Such a reversal, of course, would in no way diminish the relative conduit movability.

The apparatus, as indicated, is intended to function in connecting vertically extending conduits. However, conduits having some horizontal segments or even some limited overall horizontal inclination, in being connected by the apparatus, would benefit from its vertical stress and lateral misalignment compensating effects.

Notwithstanding the mutual freedom of movement of downstream conduit 13 and downstream piping conduit 16, for purposes of convenience of assembly and maintenance operations, it may become necessary to provide supporting means associated with the upper housing member 1 of the separator. As shown most fully in FIGURE 2, this supporting means may take the form of brackets 17 connected to and extending transversely from side wall 3 of upper housing 1. Brackets 17 extend beyond peripheral wall 5 of lower housing member 2 so as to effectively limit downward movement of upper housing 1 and connected conduit 16. Such supporting means may also be provided with vertically extending pins 18 to control lateral movement of upper housing member 1 as influenced by conduit stresses.

As illustrated, both liquid body A and liquid body B are provided with means for adding liquid thereto and permitting the outflow of liquid therefrom. For liquid body A, inlet 19 and overflow outlet 20 are provided, while for liquid body B, liquid may be added in the annular space between upper housing 1 and lower housing 2 and liquid overflow removed through outlet 21. To facilitate removal of extraneous or foreign material from the base of lower housing member 2, outlet 22 is provided.

When assembled between a flame cracking furnace and downstream piping connections, furnace conduit 13, through its associated conduit portion 14, is positioned partially within liquid body A so as to be capable of telescoping movement. Similarly, upper housing 1 is supported by downstream piping conduit 16 so as to be partially submersed in liquid body B and thus capable of telescoping movement within liquid body B.

Hot quenched gases and possibly associated quench water entering the connecting apparatus through upstream furnace conduit 13 pass downwardly into the separator into contact with liquid body B. Liquid body B, in addition to providing a surface for deflecting the incoming gases upwardly into downstream conduit 16, provides a condensing surface for removing substantial quantities of the quench water from the incoming gas. The addition of this condensed water aids in the maintenance of liquid body B at a level sufficient, at all times, to function as a liquid seal expansion joint connecting upper housing member 1 and lower housing member 2.

As illustrated, liquid body A is separated vertically from liquid body B so as to permit the free flow of fluids to the separation chamber. It will be appreciated, however, that liquid body A may actually extend somewhat into liquid body B whereby incoming gases must permeate through liquid body B prior to their exodus from the separation chamber through conduit 16. However, in either impinging upon or permeating through liquid body B, the incoming gases may have condensed therefrom, in addition to quench water, insoluble liquids and solids such as tars. Such insoluble liquids and solids will move downwardly within liquid body B into contact with inclined lower wall 6 of lower housing member 2. The thus condensed materials will then move downwardly along inclined wall 6 to the vicinity of outlet 22 from which they may be removed.

In providing the liquid seal expansion joint interconnecting separator housing members 1 and 2, safety advantages of particular significance are obtained. Should pressures within the separator, furnace conduit, or downstream piping exceed permissible limits, fluid from liquid body B will be discharged thereby preventing rupture of the separator or conduits. Upon restoration of normal or safe operating conditions, liquid body B may be recharged and operations resumed.

There are present in the subject apparatus three principal components, i.e. a separator, a furnace conduit, and a downstream piping conduit. Thermal expansion problems exist at three primary connections, i.e. at the connection to the separator of each of the conduits and at the junction of the separator housing members. There is also the problem of providing a liquid body for removal of quenching liquid. Ostensibly, at least, three liquid seal telescoping connections would be required to solve these problems. A separate connection would normally be required to join the separator housing members and to join each of the conduits to the separtor. Through the novel structure heretofore described liquid body B functions as a liquid seal expansion joint connecting the separator housing members as well as the downstream piping conduit and separator and, in addition, provides a liquid condensing surface. Thus, all of the expansion problems and the liquid removal problem are solved by the use of two liquid seal telescoping expansion joints. Through this arrangement, a substantial savings in material is effected and a connecting apparatus of considerable compactness and enhanced utility obtained.

The connecting apparatus has been described in detail as employed in connecting flame cracking furnaces to downstream piping connections. As is readily apparent, however, it offers general utility in connecting hot moisture bearing gas conduits. Although not limited in application to conduits carrying moisture bearing gases, its advantages are realized to the utmost in this connection.

The significant structural character and mode of operation of the invention have been described principally in connection with a preferred embodiment. Other embodiments characterized by the principles of the invention may also be employed, however, the scope of the invention being determined by the following appended claims.

I claim:

1. An expansion compensating and moisture condensing connection comprising a stationary lower housing member defining an upwardly open chamber, a first liquid body contained by said lower housing, a vertically movable upper housing member defining a downwardly open chamber, a vertical downstream piping conduit connected to, communicating with and independently supporting said upper housing, said upper housnig movably telescoping into said lower housing in a spaced apart relationship therewith and partially extending into said first body of liquid to form a liquid seal between said two housings thereby permitting a relative motion between said upper and lower housings, an inlet in said upper housing disposed above said first liquid body, means containing a second liquid body and supported by said upper housing, said means being within said inlet, an upstream conduit extending vertically downward with the lower terminus thereof having a connecting portion spaced from and movably telescoping into said means and extending partially into said second liquid body to form a second liquid seal between said means and said upstream conduit thereby permitting relative movement between said upstream conduit and said inlet, the entire combustion thus permitting independent movement between said lower housing and said upstream conduit, and said lower housing and said upstream conduit and said upper and lower housings.

2. An expansion compensating and moisture condensing connection comprising movably telescoping upper and lower housing members, said lower housing member being stationary and defining an upwardly open chamber which contains a first liquid body, said upper housing member defining a downwardly open chamber and extending partially into said first liquid body to form a first liquid seal expansion joint movably and sealingly connecting said upper and lower housing members, an inlet defined in said upper housing, annular trough means carried by said upper housing, said trough means being disposed within said inlet and containing a second liquid body, an upstream conduit extending vertically, the lower terminus of said upstream conduit having a connectnig portion of larger diameter than said upstream conduit extending into said second liquid body to form a second liquid seal expansion joint movably and sealingly connecting said upstream conduit to said upper housing member, and a downstream conduit extending vertically upward from said upper housing member, the lower terminus of said downstream conduit being connected rigidly to said upper housing member and being in fluid communication with the interior thereof, whereby said upstream conduit and said upper housing member are movable relative to each other and individually and independently movable relative to said lower housing member.

3. Apparatus as defined in claim 2 wherein said first and second liquid seal expansion joints are vertically spaced to permit substantially free flow of furnace gases from said upstream conduit through said apparatus to said downstream conduit, wherein said first and second liquid seal expansion joints include means for introducing liquid thereinto and means for allowing outflow of liquid therefrom, and wherein said lower housing member contains means for collecting insoluble material separated from gases passing through said apparatus.

References Cited in the file of this patent

UNITED STATES PATENTS

| | | |
|---|---|---|
| 899,628 | Sepulchre | Sept. 29, 1908 |
| 931,229 | Sepulchre | Aug. 17, 1909 |
| 1,930,756 | Heath et al. | Oct. 17, 1933 |
| 2,792,905 | Forrest | May 21, 1957 |

FOREIGN PATENTS

| | | |
|---|---|---|
| 8,940 | Great Britain | Apr. 15, 1909 |
| 533,389 | Great Britain | Feb. 12, 1941 |

UNITED STATES PATENT OFFICE
CERTIFICATE OF CORRECTION

Patent No. 3,075,753　　　　　　　　　　　January 29, 1963

George A. Akin

It is hereby certified that error appears in the above numbered patent requiring correction and that the said Letters Patent should read as corrected below.

Column 5, line 19, for "combustion" read -- combination --.

Signed and sealed this 20th day of August 1963.

(SEAL)
Attest:

ERNEST W. SWIDER
Attesting Officer

DAVID L. LADD
Commissioner of Patents